(12) United States Patent
Rajagopalan et al.

(10) Patent No.: US 11,275,574 B2
(45) Date of Patent: Mar. 15, 2022

(54) RECOVERING THE LAST SUCCESSFUL DEVICE UPDATE ON A COMPUTING SYSTEM

(71) Applicant: Dell Products L.P., Round Rock, TX (US)

(72) Inventors: Vivekanandh Narayanasamy Rajagopalan, Bangalore (IN); Trinto Thattil Nadakkalan Antony, Kerala (IN); Ambadas Devrao Jadhav, Ahmednagar District (IN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 16/780,230

(22) Filed: Feb. 3, 2020

(65) Prior Publication Data
US 2021/0240461 A1   Aug. 5, 2021

(51) Int. Cl.
   *G06F 8/65* (2018.01)
   *H04L 67/00* (2022.01)

(52) U.S. Cl.
   CPC .............. *G06F 8/65* (2013.01); *H04L 67/34* (2013.01)

(58) Field of Classification Search
   CPC ..... G06F 8/60; G06F 8/61; G06F 8/65; H04L 67/34
   USPC ......................................... 717/121, 168–178
   See application file for complete search history.

(56) References Cited

U.S. PATENT DOCUMENTS

| | | | | |
|---|---|---|---|---|
| 10,732,957 | B2* | 8/2020 | Dattatri | G06F 8/61 |
| 10,789,057 | B2* | 9/2020 | Vichare | G06F 8/60 |
| 2007/0073978 | A1* | 3/2007 | Lee | G06F 8/65 |
| | | | | 711/141 |
| 2008/0301665 | A1* | 12/2008 | Charlton | G06F 8/65 |
| | | | | 717/170 |
| 2009/0100421 | A1* | 4/2009 | Flaming | G06F 8/658 |
| | | | | 717/174 |
| 2012/0198434 | A1* | 8/2012 | Dirstine | G06F 8/65 |
| | | | | 717/170 |
| 2020/0225923 | A1* | 7/2020 | Chakravarthy | G06F 8/65 |

* cited by examiner

*Primary Examiner* — Marina Lee
(74) *Attorney, Agent, or Firm* — Kirton McConkie; Brian Tucker

(57) ABSTRACT

The last successful device update can be recovered on a computing system. An update tool can be employed to detect whether an update package is installed successfully. When an update package is successfully installed, the update tool can define a last successful device update that associates the update package with the device that the update package targets. In contrast, when the update package does not install successfully, the update tool can access the last successful device update for the targeted device and use it to obtain and install the previous update package that the last successful device update represents. In this way, the related components for a device can be rolled back to a common state to prevent incompatibilities that may otherwise exist due to the failed installation.

19 Claims, 9 Drawing Sheets

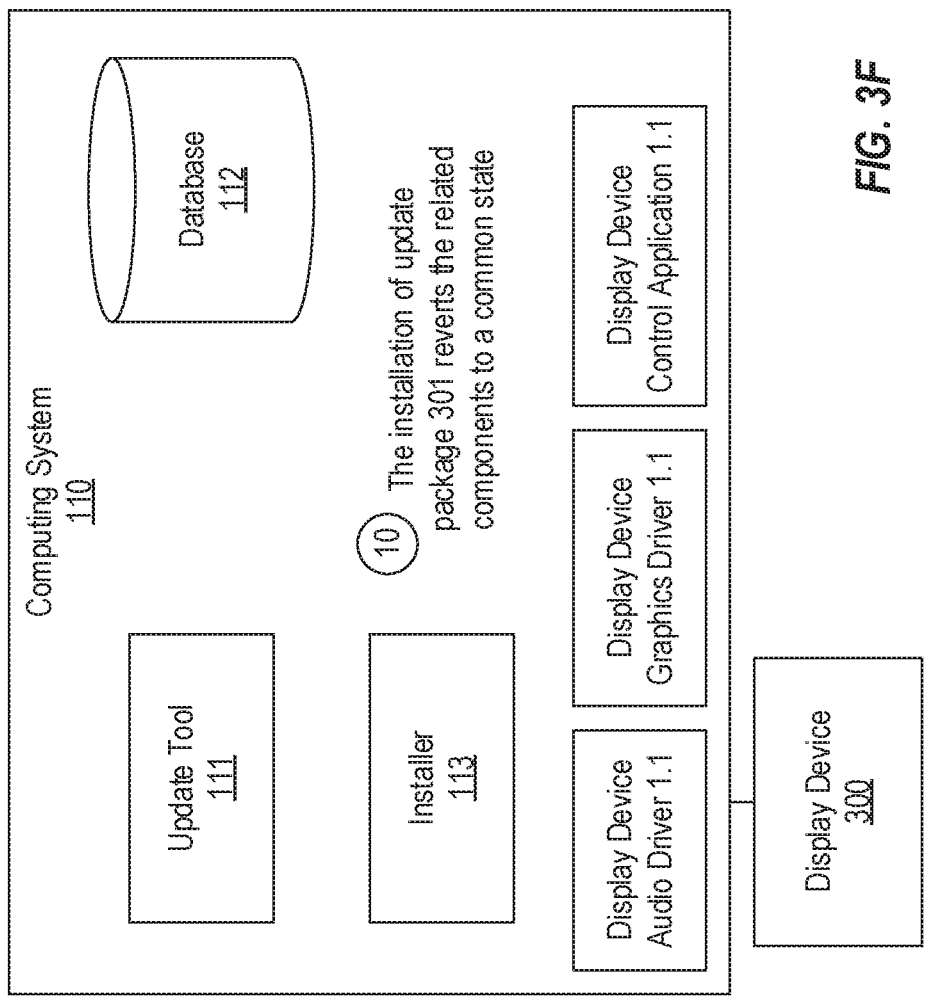

RECOVERING THE LAST SUCCESSFUL DEVICE UPDATE ON A COMPUTING SYSTEM

CROSS-REFERENCE TO RELATED APPLICATIONS

N/A

BACKGROUND

Original equipment manufacturers (OEMs) such as Dell, HP, Lenovo, etc. oftentimes provide device updates in the form of update packages. An update package is usually in the form of a self-extracting executable file (e.g. an .exe file) that includes multiple related components. For example, an update package for a display device may include a graphics driver, an audio driver and a control application. A primary reason for bundling the multiple related components into a single update package is to ensure that all of the related components will be installed/updated to the latest versions so that no incompatibilities will exist.

Even with the bundling of related components into a single update package, incompatibilities will inevitably occur. For example, during the installation process, some failure may occur after some of the components have installed correctly while others have not (e.g., when one driver's INF file(s) are installed and another driver's INF file(s) are not). In such cases, the device may end up relying on both old and new components for its functionality—components that may not be compatible. Regardless of the reason, any partial installation of an update package will likely degrade the end user experience and lead to support calls.

BRIEF SUMMARY

The present invention extends to methods, systems, and computer program products for recovering the last successful device update on a computing system. An update tool can be employed to detect whether an update package is installed successfully. When an update package is successfully installed, the update tool can define a last successful device update that associates the update package with the device that the update package targets. In contrast, when the update package does not install successfully, the update tool can access the last successful device update for the targeted device and use it to obtain and install the previous update package that the last successful device update represents. In this way, the related components for a device can be rolled back to a common state to prevent incompatibilities that may otherwise exist due to the failed installation.

In some embodiments, the present invention is implemented by an update tool as a method for recovering a last successful device update on a computing system. The update tool receives a first update package that targets a device on the computing system. The first update package includes multiple related components for the device. The update tool detects that installation of the first update package has failed. In response, the update tool accesses a last successful device update that is defined for the device and identifies a second update package that is defined in the last successful device update. The update tool then causes the second update package to be installed on the computing system. The second update package also includes the multiple related components for the device.

In some embodiments, the present invention is implemented as computer storage media storing computer executable instructions which when executed on a computing system implement an update tool that is configured to recover a last successful device update on a computing system. The update tool receives a first update package that targets a device on the computing system. The first update package includes multiple related components for the device. The update tool detects that installation of the first update package has completed successfully. In response, the update tool creates a last successful device update that associates the first update package with the device. The update tool receives a second update package that targets the device. The second update package includes the multiple related components for the device. The update tool detects that installation of the second update package has failed. In response to the failed installation, the update tool accesses the last successful device update to identify the first update package and causes the first update package to be installed on the computing system.

In some embodiments, the present invention is implemented as a computing system that includes one or more processors and computer storage media storing computer executable instructions which when executed by the one or more processors implement an update tool. The update tool is configured to detect when an update package is installed successfully and, in response, define a last successful device update that associates the update package with a device that the update package targets. The update tool is also configured to detect when an update package is not installed successfully and, in response, employ the last successful device update to retrieve and install the update package that the last successful device update associates with the device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3F provides an example of how an update tool can create and use a last successful device update for a device.

DETAILED DESCRIPTION

In the specification and the claims, a "computing system" should be construed as encompassing desktops, laptops, tablets, smart phones and other similar end user computing devices. As a common example, a computing system could run a version of the Windows operating system, but the present invention should not be limited to implementations on Windows-based computing systems. In contrast, the term "device" should be construed as a hardware device or virtual device that is connected to or integrated into a computing system. Common examples of devices would therefore include a monitor, a printer, a keyboard, a mouse, a network card, a storage device, a bus, etc.

The term "device driver" or simply "driver" should be given its ordinary meaning such as software that enables the operating system to access a device. The term "firmware" should also be given its ordinary meaning such as software that is installed on the device. The term "control application" will be used to represent software with which a user interacts to control, access, monitor, etc. the function of a device. As an example, Intel provides the UHD Graphics Control Panel as a control application for its graphics controllers.

The term "update package" should be construed as a bundle of related components that, when installed on a computing system, work together to provide functionality for a particular device. The components of an update package could include drivers, firmware and/or a control application. As an example, an update package for a display device may be in the form of an .exe file that includes audio and display drivers (e.g., .sys files and corresponding INF file(s) when the update package is for a Windows computing system) and a control application. For clarity, it is noted that the installation of an update package could result in components being newly installed on a computing system or in existing components being modified or replaced. As examples, if the drivers and control application for a device had not been previously installed on a computing system or had been removed, an update package could be installed to cause the drivers and control application to newly exist. In contrast, if earlier versions of the drivers and the control application for the device already exist on the computing system, the update package could be installed to update (i.e., modify or replace) these drivers and control application. In short, the presence of the word "update" in "update package" should not be viewed as limiting the present invention to instances where existing components are updated.

Figure 1:
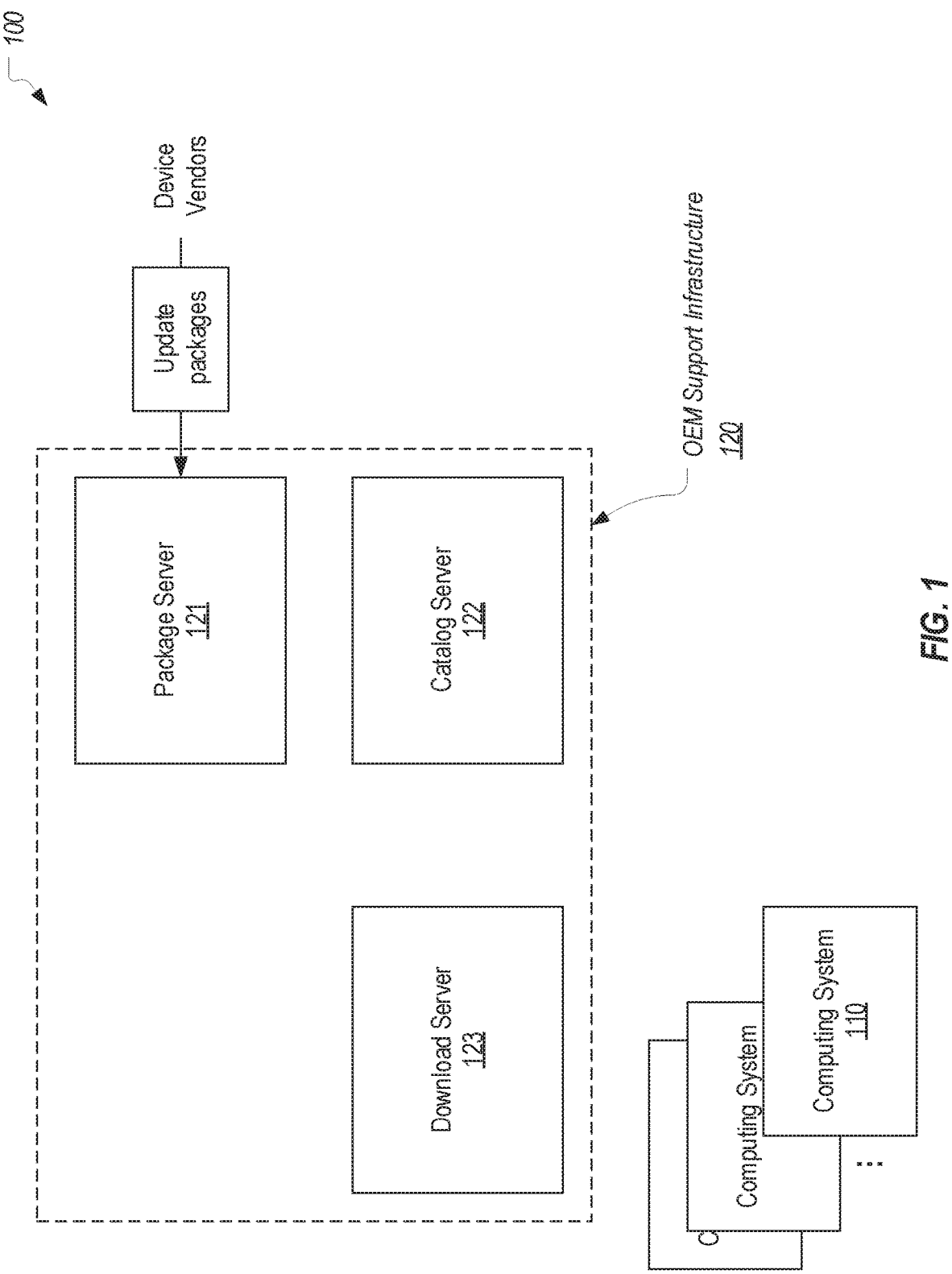
FIG. 1 illustrates an example computing environment in which the present invention can be implemented.

FIG. 1 illustrates an example computing environment 100 in which the present invention may be implemented. Computing environment 100 includes a number of computing systems 110 and an OEM support infrastructure 120. OEM support infrastructure 120 can represent the components that an OEM employs to provide support services which may include a package server 121, a catalog server 122 and a download server 123 among possibly many other servers. In this context, the term "server" should be construed as representing any suitable arrangement of hardware and/or software components that would enable the functionality described herein to be accomplished. The depiction of each server being separate is for illustrative purposes only. For example, in some embodiments, some or all of the depicted servers could be implemented within the same cloud architecture, whereas, in other embodiments, each depicted server could be implemented on a separate computing device. In short, the present invention should not be limited to any particular architecture but should encompass the described functionality that can be implemented in a wide variety of architectures.

Figure 2:
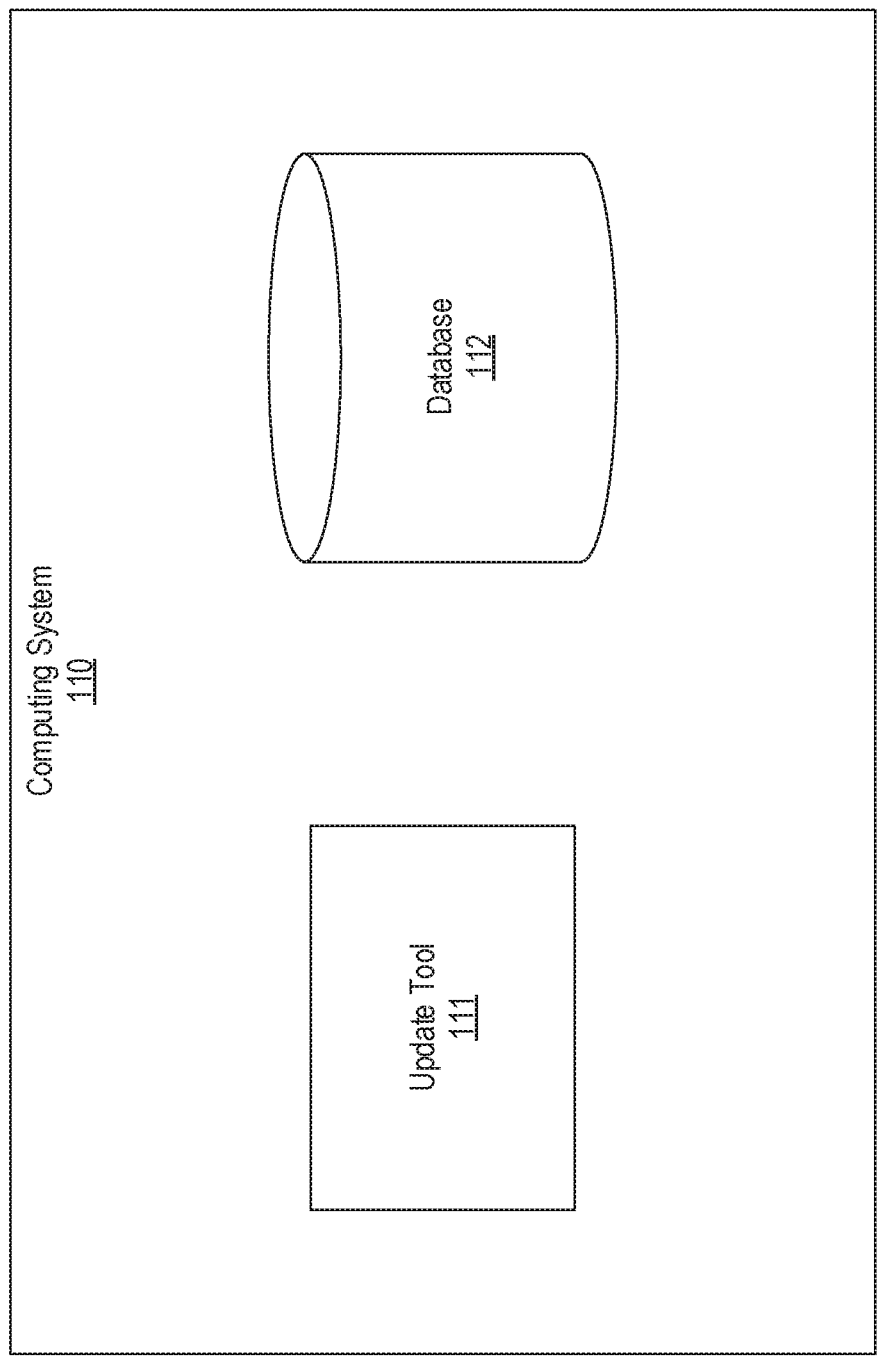
FIG. 2 illustrates an example of components that may be installed on a computing system to enable embodiments of the present invention to be implemented.

FIG. 2 illustrates an example of components that may be employed on computing system 110 to enable embodiments of the present invention to be implemented. As shown, each computing system 110 that is configured to support embodiments of the present invention can include an update tool 111 and a database 112. Update tool 111 can represent the software component(s) that an OEM may provide to allow update packages to be deployed on computing systems 110. Database 112 can represent any number and/or type of data structure(s) that may be used to store information defining "last successful device updates" on the corresponding computing system 110. A "last successful device update" should be construed as information that identifies a particular update package that was completely, successfully and most recently installed on the corresponding computing system 110 for a particular device. An update package should be considered as having been completely and successfully installed when each component (e.g., each driver, control application and/or firmware) defined in the update package was successfully installed. Accordingly, in typical embodiments, database 112 will define many different last successful device updates—one for each device that update tool 111 may manage. Also, in some embodiments, database 112 may maintain previous successful device updates and link them to the corresponding last successful device updates.

Computing systems 110 could represent all of an OEM's computing systems or some grouping of an OEM's computing systems (e.g., all of a company's Dell desktops and laptops). Download server 123 can represent the components in OEM support infrastructure 120 that enable update tool 111 to download (or otherwise retrieve) packages for installation on computing systems 110. As an example only, download server 123 could encompass the components that implement the downloads.dell.com and support.dell.com websites and corresponding back-end services. Catalog server 122 can represent the components in OEM support infrastructure 120 that create and maintain catalogs. For purposes of this description, a catalog should be construed as metadata (e.g., an XML file) that identifies and describes update packages that are available for one or more computing systems. Update tool 111 can retrieve a catalog from download server 123 and evaluate it to determine which, if any, update packages should be retrieved and installed on a computing system.

Package server 160 can represent the components in OEM support infrastructure 120 that receive and store update packages from device vendors. For example, Intel may create update packages for its graphics controllers and upload them to package server 160 so that the update packages can be distributed to computing systems 110 via download server 123.

Figure 3A:
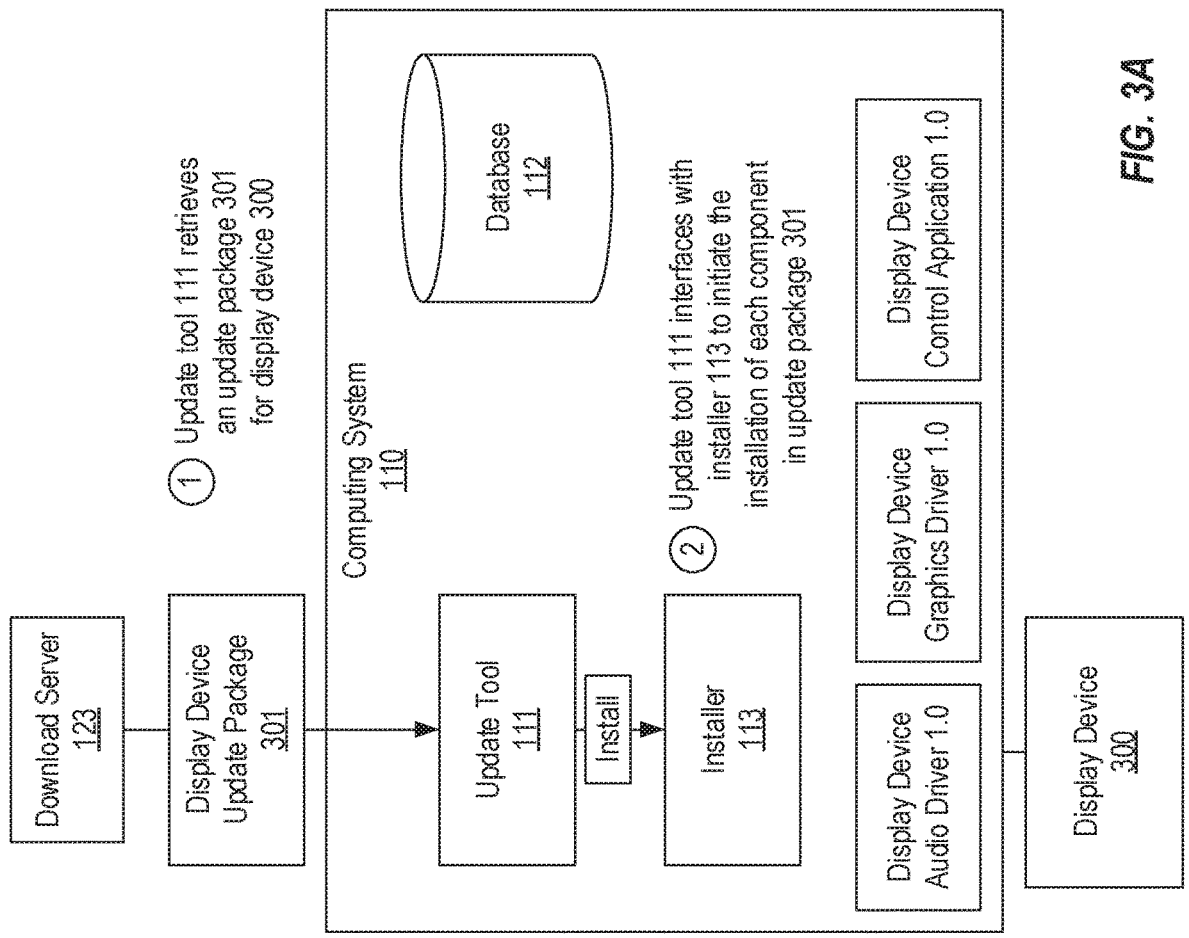

FIGS. 3A-3F provide an example of how update tool 111 can define and use a last successful device update in accordance with embodiments of the present invention. In this example, and as represented in FIG. 3A, it will be assumed that a display device 300 is connected to computing system 110 and that a version 1.0 of an audio driver, a graphics driver and a control application (the "related components") for display device 300 have been installed on computing system 110. It will also be assumed that an update package 301 is available for display device 300 and that this update package defines updates for all three of the related components. In this context, update tool 111 retrieves update package 301 in step 1. As mentioned above, update package 301 may be in the form of a self-extracting executable that encapsulates all of the content necessary to update the related components. For example, in a Windows-based implementation, update package 301 could include a number of .sys files, .inf files, .exe files, .dll files, .msi files, etc.

In this example, it is assumed that, in step 2, update tool 111 interfaces with an installer 113 (e.g., the Windows Installer) to initiate the installation of the three related components. However, in some embodiments, update tool 111 may perform some or all of the installation process independent of any system-provided installer. Therefore, step 2 should be viewed as encompassing whatever process is performed to install the related components of update package 301. Of importance is the fact that the deployment of update package 301 on computing system 110 entails updating the multiple related components pertaining to display device 300.

Figure 3B:
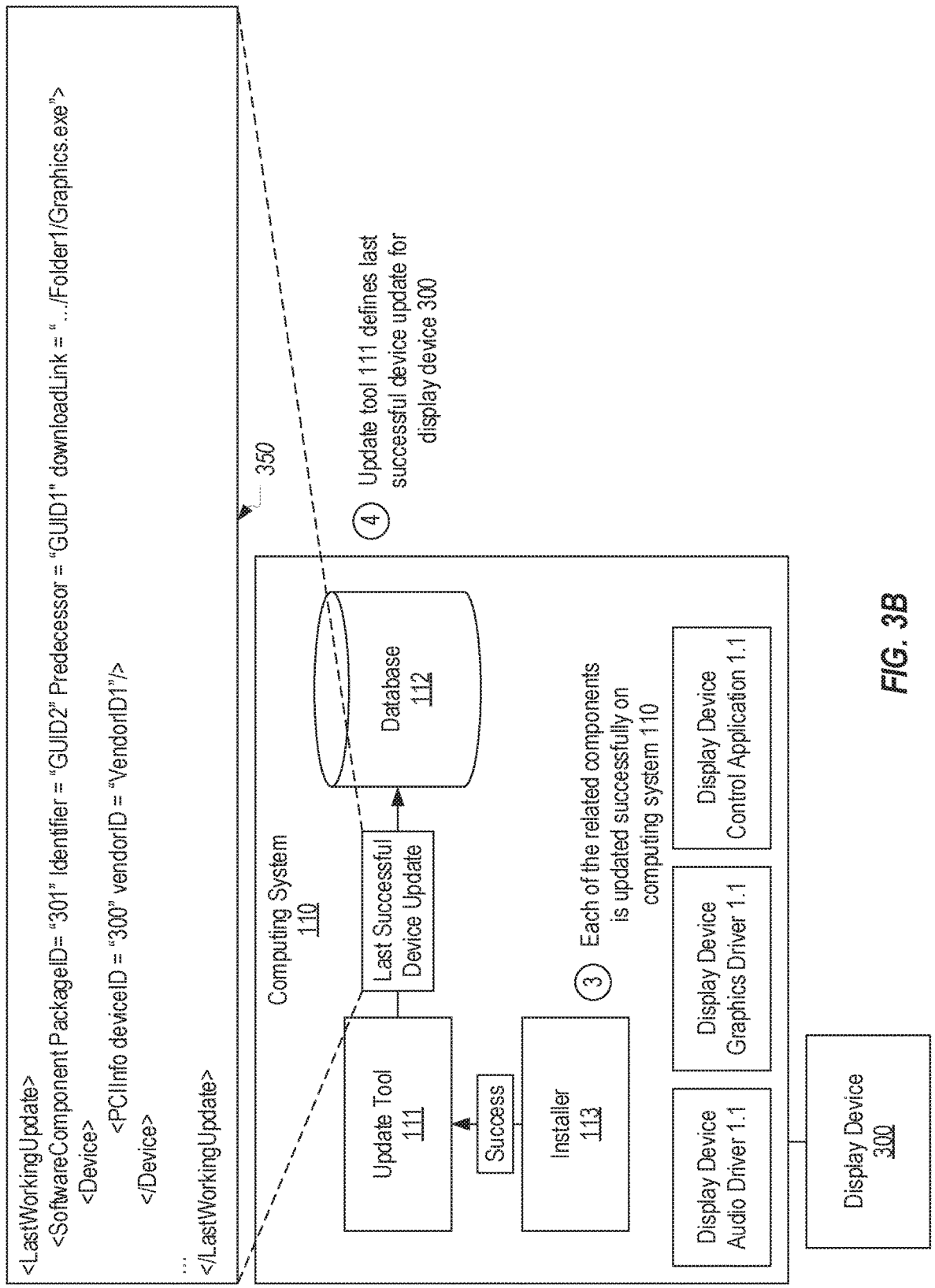
Figure 3C:
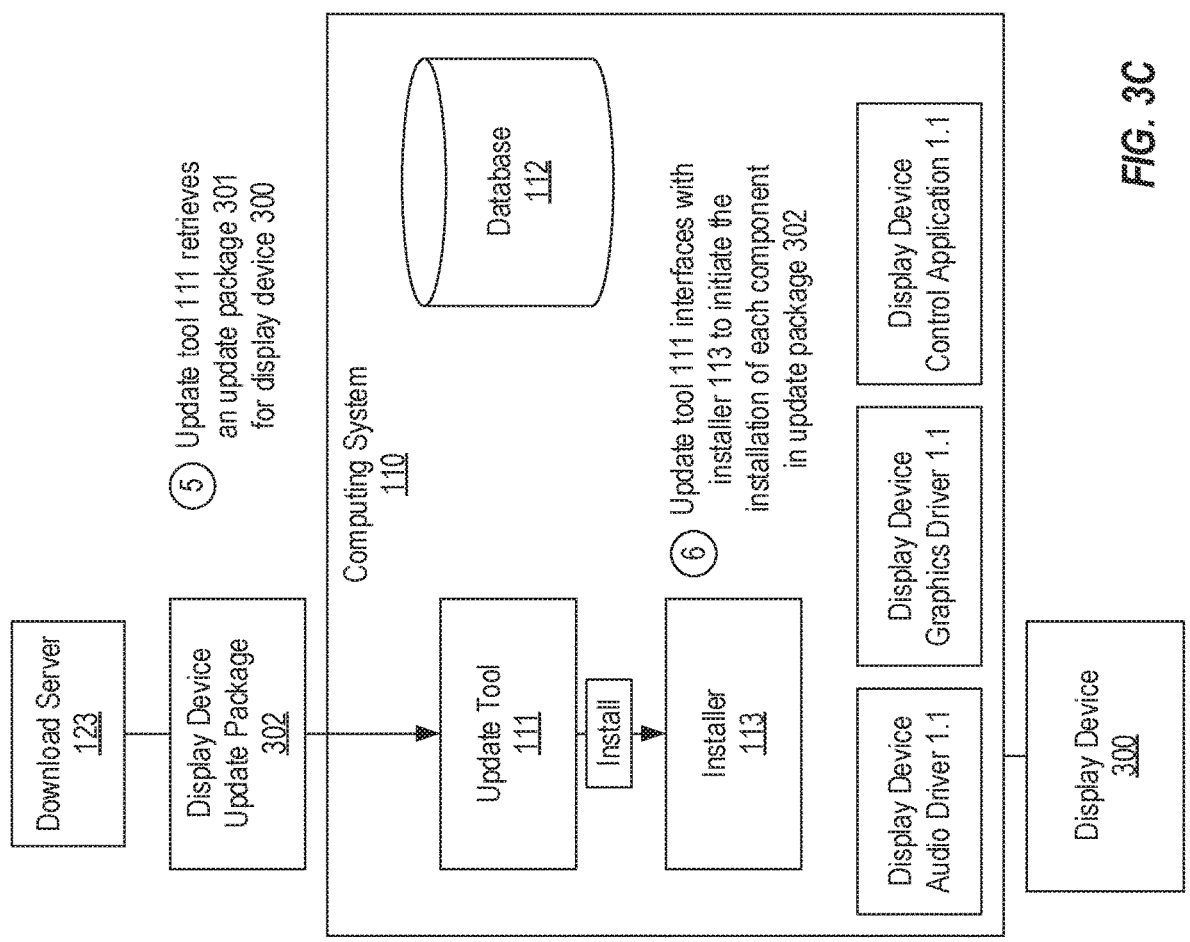

Turning to FIG. 3B, it is assumed that, in step 3, each of the related components was successfully updated as is represented by each component now being version 1.1. As one example only, installer 113 could return a success value as opposed to an error message in conjunction with completing the installation of each of the related components. Regardless of how update tool 111 may detect that each component of update package 301 was successfully installed, in step 4, update tool 111 can update database 112 to define a last successful device update 350 for display device 300.

FIG. 3B provides an example of how last successful device update 350 may be defined in database 112. In this example, database 112 defines last successful device updates in XML format. In particular, the "LastWorkingUpdate" element is used to encapsulate the information that defines a last successful device update for a particular device. Within the LastWorkingUpdate element, a "SoftwareComponent" element defines an identifier of the update package (e.g., PackageID="301"), a unique identifier for this last working device update (e.g., Identifier="GUID2"), a unique identifier for a prior working device update (e.g., predecessor="GUID1") and a download link for the update package (e.g., downloadLink=" . . . /Folder1/Graphics.exe"). Although not shown, the SoftwareComponent element could eventually define a unique identifier for a subsequent successful device update (e.g., successor="GUID3") such that a linked list of successful device updates is defined for the device. Other update-package-specific information could also be defined within the SoftwareComponent element such as a release date, a version, an installation date, etc. A "Device" element is also employed to define one or more identifiers of the device to which the last working device update pertains (e.g., deviceID="300" vendorID="VendorID1"). In this XML-based example, the nesting of the Device element within the SoftwareComponent element associates the update package with the device. Of course, other techniques/formats could equally be used to define this association. Although not shown, other information could be included in the LastWorkingUpdate element such as cryptographic information (e.g., a signature) for the update package.

To create a last successful device update, update tool 111 could obtain the identifier of the update package and the identifier(s) of the device from the update package itself. For example, update package 301 could include metadata (e.g., an XML file) that provides these identifiers. Update tool 111 could also employ the identifier(s) of the device to locate the existing last working device update in database 112. For example, update tool 111 could locate an existing LastWorkingUpdate element in database 112 that is associated with a device having the deviceID of 300. Update tool 111 could then replace/modify this existing LastWorkingUpdate element with what is shown in FIG. 3B.

Accordingly, last working device update 350, which has an identifier of GUID2, defines that an update package having an identifier of "301" was the update package that was completely, successfully and most recently installed on computing system 110 for display device 300. Last working device update 350 also defines that the previous working device update for display device 300, which could have been created as the last working device update when version 1.0 was successfully installed, has an identifier of GUID1. Although not shown, database 112 could also maintain such previous working device updates so that update tool 111 could retrieve them if necessary (e.g., to roll back to an earlier update package or to view a history of successful device updates on the computing system).

Figure 3D:
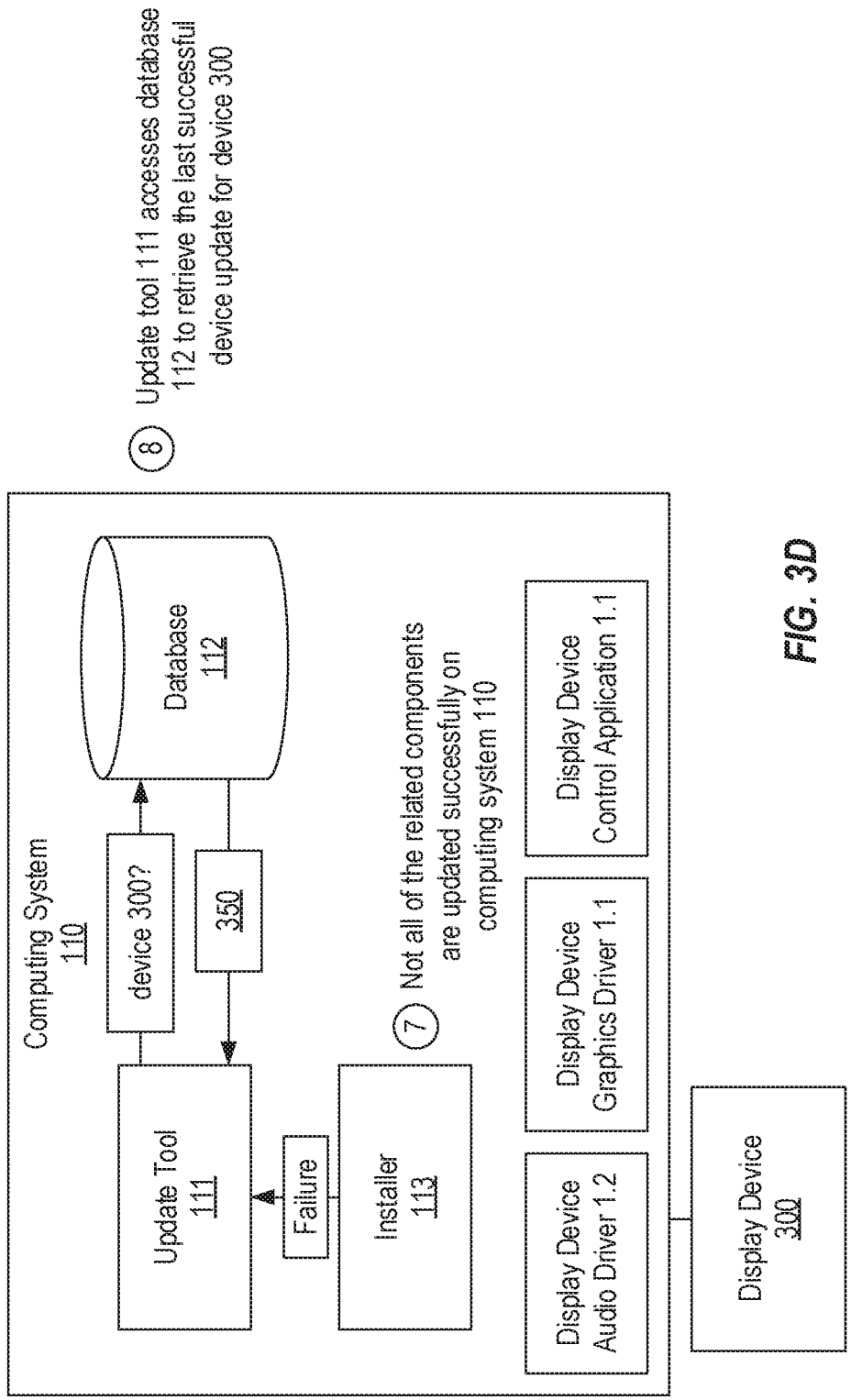

At some time subsequent to the creation of last successful device update 350 in database 112, it is assumed that another update package 302 pertaining to display device 300 becomes available. Like update package 301, update package 302 can include identifier(s) of display device 300 (e.g., deviceID="300" vendorID="VendorID1"). In step 5 shown in FIG. 3C, update tool 111 is shown as retrieving update package 302 and causing it to be installed in step 6. However, in step 7 shown in FIG. 3D, it is assumed that update tool 111 detects that not all of the related components in update package 302 are successfully installed. For example, FIG. 3D represents that the audio driver is successfully updated to version 1.2 but the graphics driver and the control application are not successfully updated. The reason for the failed installation is not important to the present invention. Of importance is the fact that update tool 111 detects that update package 302 was not completely and successfully installed.

In response to detecting that update package 302 was not completely and successfully installed, in step 8, update tool 112 can access database 112 to locate the last successful device update for display device 300. For example, update tool 111 could employ the identifier(s) of display device 300 that are defined in update package 302 and use the identifier(s) to locate a last successful device update that is associated with the same identifiers. In this example, update tool 111 will locate last successful device update 350 as the last successful device update for display device 300.

Figure 3E:
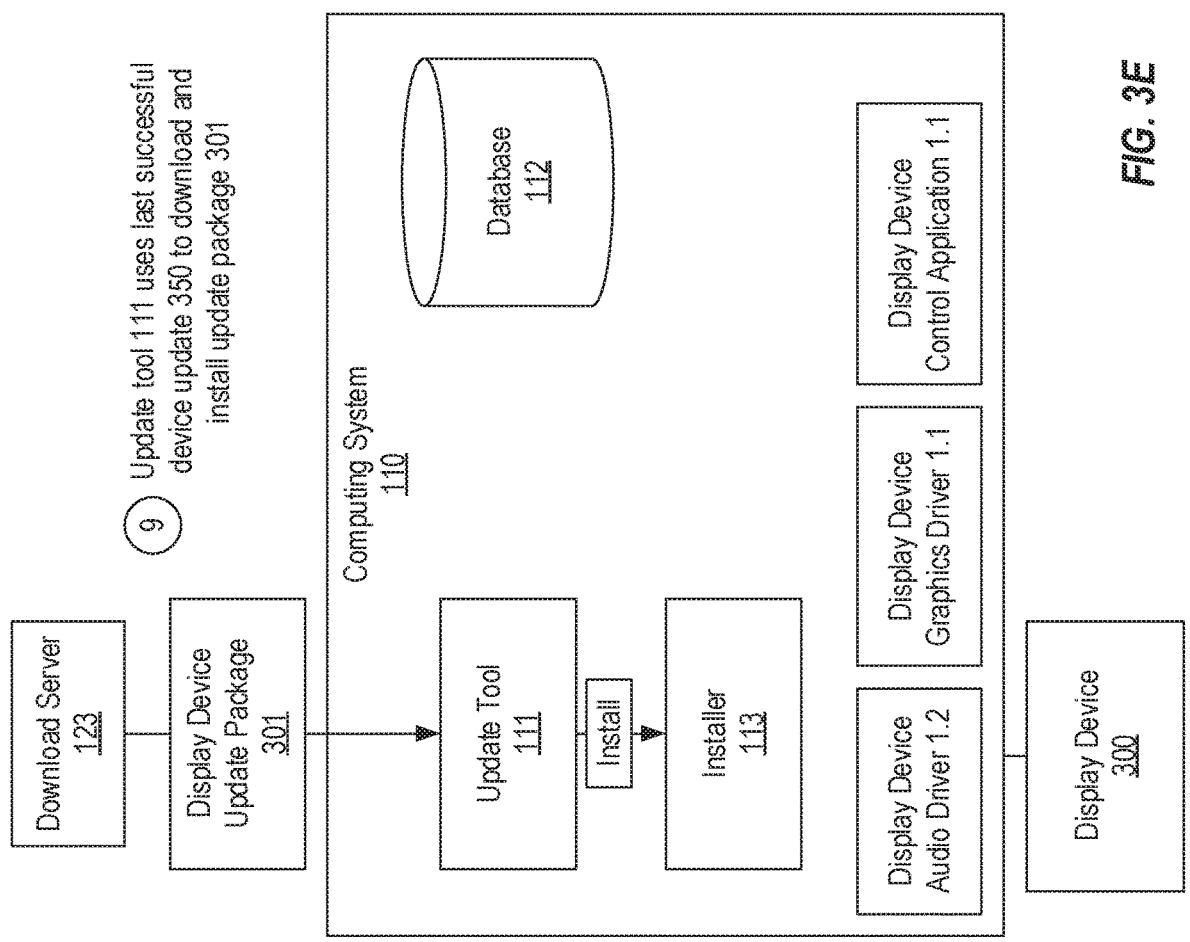

Turning to FIG. 3E, in step 9, update tool 111 can employ last successful device update 350 to retrieve and install the update package identified in the last successful device update, which in this case is the update package having a PackageId of 301 that is available for download at . . . /Folder1/Graphics.exe. As represented in FIG. 3F, the installation of update package 301 will cause the audio driver to be returned to version 1.1 and possibly correct any other issues or incompatibilities that may have been introduced by the failed installation of update package 302. In other words, by locating the last successful device update for a particular device, update tool 111 can identify and obtain the link for downloading the corresponding update package and then install the update package to cause the related components for the particular device to be returned to the state that the last successful device update represents. Notably, this process does not merely roll back a particular component, but ensures that all the related components of the previous update package that the last successful device update represents are installed to thereby correct any incompatibility issues that may have been introduced when the current update package failed to install correctly.

Figure 4:
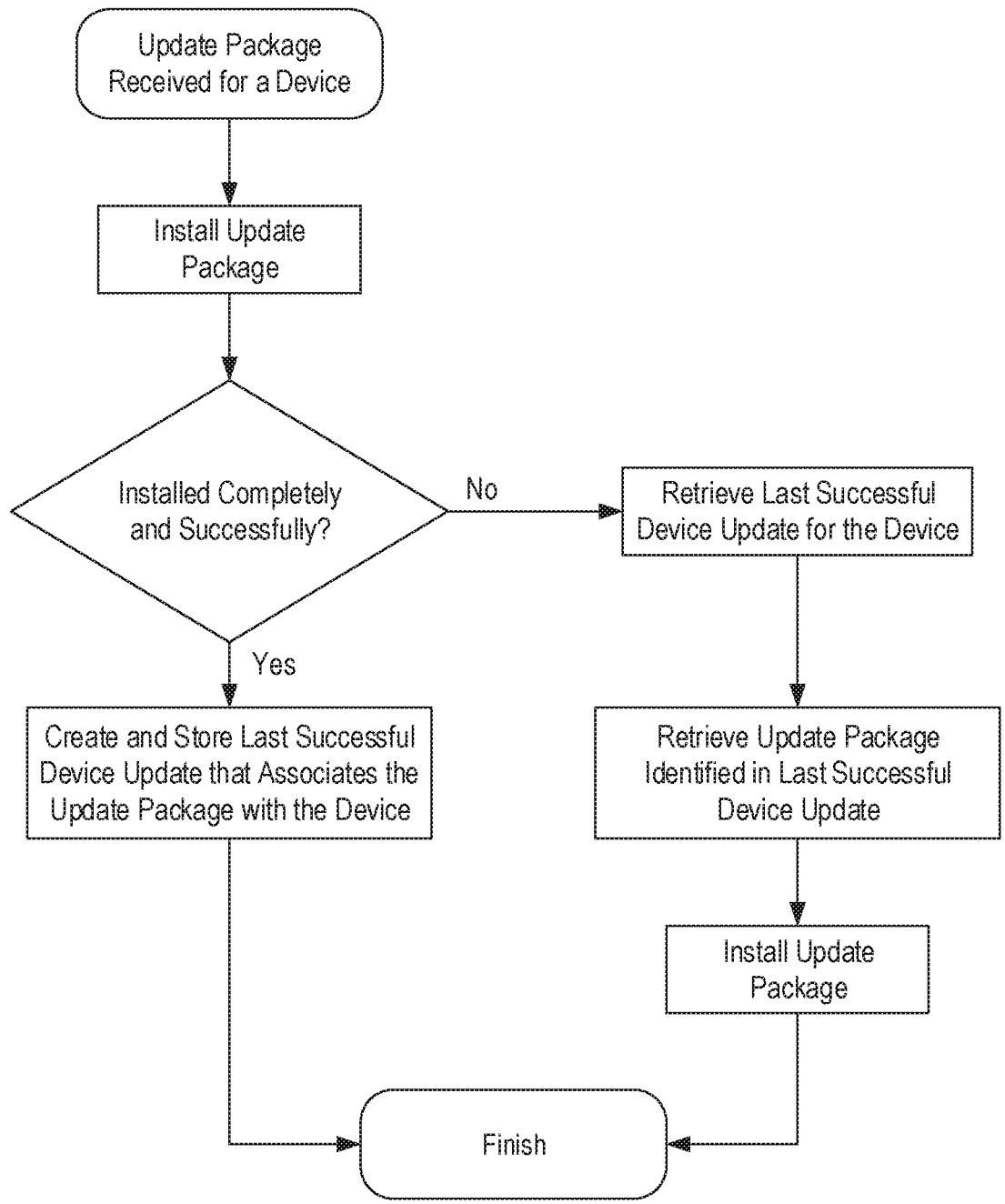
FIG. 4 provides an example flow diagram that summarizes how the update tool can create and use a last successful device update.

FIG. 4 provides a flow diagram that summarizes how an update tool that executes on a computing system can create and use last successful device updates for any number of devices on the computing system. As shown, when the update tool receives an update package that targets a particular device, it can attempt to install the update package. The update tool can then determine whether the update package was installed completely and successfully. In other words, the update tool can determine whether each component in the update package was successfully installed. If so, the update tool can create and store a last successful device update that associates the update package with the particular device. Creating and storing this last successful device update can include replacing an existing last successful device update for the particular device and linking the newly created last successful device update to the existing last successful device update. In contrast, if the update package did not install completely and successfully, the update tool can retrieve the last successful device update for the particular device. The update tool can then retrieve the update package that is identified in this last successful device update and install it on the computing system thereby returning the related components for the device to be returned to the prior common state.

To summarize, by maintaining a database that defines last successful device updates, an update tool can roll back all the related components for a device to their previous successfully installed version. In this way, the occurrence of incompatible versions of related components, whether due to a failed or partial installation, can be avoided. The vendor's goal in combining the related components into a single update package is typically to ensure that compatible versions of the related components are all installed together. The present invention provides a mechanism to accomplish this goal in spite of a failure during installation.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an update tool, for recovering a last successful device update on a computing system, the method comprising:
   receiving a first update package that targets a device on the computing system, the first update package including multiple related components for the device;
   detecting that installation of the first update package has completed successfully;
   in response, creating a last successful device update that associates the first update package with the device;
   receiving a second update package that targets the device, the second update package including the multiple related components for the device;
   detecting that installation of the second update package has failed;
   in response to the failed installation, accessing the last successful device update to identify the first update package; and
   causing the first update package to be installed on the computing system.

2. The method of claim 1, wherein the multiple related components include at least one driver for the device.

3. The method of claim 2, wherein the multiple related components also include a control application for the device.

4. The method of claim 1, wherein the multiple related components included in the first update package are prior versions of the multiple related components included in the second update package.

5. The method of claim 1, wherein detecting that installation of the second update package has failed comprises detecting that at least one of the multiple related components failed to install.

6. The method of claim 1, wherein accessing the last successful device update to identify the first update package comprises determining that the last successful device update includes an identifier of the device.

7. The method of claim 1, wherein causing the first update package to be installed on the computing system comprises using a download link defined in the last successful device update to download the first update package.

8. The method of claim 1, further comprising:
   receiving a third update package that targets the device, the third update package including the multiple related components for the device;
   detecting that installation of the third update package has completed successfully;

in response, updating the last successful device update for the device to identify the third update package.

9. The method of claim 8, wherein updating the last successful device update for the device to identify the third update package comprises defining an association between an identifier of the device and an identifier of the third update package.

10. The method of claim 9, wherein updating the last successful device update for the device to identify the third update package further comprises identifying the first update package as a predecessor.

11. One or more computer storage media storing computer executable instructions which when executed on a computing system implement an update tool that is configured to recover a last successful device update on a computing system by performing the following:
    receiving a first update package that targets a device on the computing system, the first update package including multiple related components for the device;
    detecting that installation of the first update package has completed successfully;
    in response, creating a last successful device update that associates the first update package with the device;
    receiving a second update package that targets the device, the second update package including the multiple related components for the device;
    detecting that installation of the second update package has failed;
    in response to the failed installation, accessing the last successful device update to identify the first update package; and
    causing the first update package to be installed on the computing system.

12. The computer storage media of claim 11, wherein the multiple related components include multiple drivers.

13. The computer storage media of claim 12, wherein the multiple related components include at least one driver and a control application.

14. The computer storage media of claim 11, wherein creating the last successful device update that associates the first update package with the device comprises defining an association between an identifier of the first update package and an identifier of the device.

15. The computer storage media of claim 11, wherein creating the last successful device update that associates the first update package with the device comprises linking the last successful device update to a predecessor successful device update, the predecessor successful device update associating a different update package with the device.

16. The computer storage media of claim 11, wherein the multiple related components included in the second update package comprise subsequent versions of the multiple related components included in the first update package.

17. The computer storage media of claim 11, wherein detecting that installation of the second update package has failed comprises detecting that the second update package was only partially installed.

18. A computing system comprising:
    one or more processors; and
    computer storage media storing computer executable instructions which when executed by the one or more processors implement an update tool that is configured to recover a last successful device update on the computing system by performing the following:
        receiving a first update package that targets a device on the computing system, the first update package including multiple related components for the device;
        detecting that installation of the first update package has completed successfully;
        in response, creating a last successful device update that associates the first-update package with the device;
        receiving a second u date package that targets the device the second update package including the multiple related components for the device;
        detecting that installation of the second update package has failed;
        in response to the failed installation, accessing the last successful device u date to identify the first update package; and
        causing the first update package to be installed on the computing system.

19. The computing system of claim 18, wherein the update tool maintains last successful device updates for a plurality of devices.

* * * * *